US010539957B2

(12) United States Patent
Seko et al.

(10) Patent No.: US 10,539,957 B2
(45) Date of Patent: Jan. 21, 2020

(54) METHODS AND SYSTEMS FOR ENABLING A VEHICLE TO PARK REMOTELY

(71) Applicant: HONDA MOTOR CO., LTD., Minato-ku, Tokyo (JP)

(72) Inventors: Shigeyuki Seko, Campbell, CA (US); Shinichi Akama, Cupertino, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 136 days.

(21) Appl. No.: 15/868,646

(22) Filed: Jan. 11, 2018

(65) Prior Publication Data

US 2019/0212727 A1  Jul. 11, 2019

(51) Int. Cl.
| G06K 9/00 | (2006.01) |
| G05D 1/00 | (2006.01) |
| G06T 7/70 | (2017.01) |
| G06K 9/46 | (2006.01) |
| G05D 1/02 | (2006.01) |
| G06T 7/00 | (2017.01) |

(52) U.S. Cl.
CPC ......... G05D 1/0033 (2013.01); G05D 1/0246 (2013.01); G06K 9/4604 (2013.01); G06T 7/70 (2017.01)

(58) Field of Classification Search
CPC .................. G06K 9/00; G05D 1/00
USPC ........................................................ 382/104
See application file for complete search history.

(56) References Cited

U.S. PATENT DOCUMENTS

| 10,121,370 B2 * | 11/2018 | Elsheemy ............ B60R 25/00 |
| 10,169,794 B2 * | 1/2019 | Aziz .................... G01C 21/362 |
| 10,336,318 B2 * | 7/2019 | Aich ..................... B60W 30/06 |
| 2004/0119610 A1 | 6/2004 | Maemura et al. |
| 2004/0233036 A1 | 11/2004 | Sefton |
| 2010/0211267 A1 | 8/2010 | Shimazaki et al. |
| 2012/0323423 A1 | 12/2012 | Nakamura et al. |
| 2014/0139677 A1 | 5/2014 | Lambert et al. |
| 2016/0078299 A1 | 3/2016 | Nerayoff et al. |
| 2017/0043766 A1 | 2/2017 | Ha et al. |

(Continued)

FOREIGN PATENT DOCUMENTS

| CN | 105702087 A | 6/2016 |
| DE | 10 2008 051 982 A1 | 6/2009 |

(Continued)

OTHER PUBLICATIONS

International Search Report and Written Opinion of the International Searching Authority issued in corresponding PCT Application No. PCT/US2019/012865 dated Apr. 9, 2019.

*Primary Examiner* — Abolfazl Tabatabai

(74) *Attorney, Agent, or Firm* — Arent Fox LLP

(57) ABSTRACT

Systems and methods for enabling a vehicle to park remotely. The system includes a memory that stores instructions for executing processes for enabling a vehicle to park remotely, and a processor that executes the instructions. In some aspects, the instructions cause the processor to: analyze an image of the vehicle to identify a vehicle type; extract vehicle information related to the vehicle type; calculate a distance between a mobile device and the vehicle based on the vehicle information and a location of the mobile device; determine whether the mobile device is within a predetermined distance of the vehicle; and enable the vehicle to park remotely when the mobile device is within the predetermined distance.

14 Claims, 6 Drawing Sheets

(56) References Cited

U.S. PATENT DOCUMENTS

2017/0043808 A1    2/2017  Yang
2017/0129537 A1    5/2017  Kim
2017/0144654 A1    5/2017  Sham

FOREIGN PATENT DOCUMENTS

| JP | 2007-326428 A | 12/2007 |
| JP | 2010-89642 A | 4/2010 |
| JP | 2013-32105 A | 2/2013 |
| KR | 10-2007-0091931 A | 9/2007 |
| KR | 10-2014-0098443 A | 8/2014 |
| KR | 10-2014-0146361 A | 12/2014 |
| KR | 10-2016-0061654 A | 6/2016 |
| KR | 10-2016-0066776 A | 6/2016 |

\* cited by examiner

METHODS AND SYSTEMS FOR ENABLING A VEHICLE TO PARK REMOTELY

TECHNICAL FIELD

The present disclosure relates to methods and systems for enabling a vehicle to park remotely.

BACKGROUND

Self-parking vehicles are generally used in parallel parking situations, which requires parking vehicles parallel to a curb, for example, and in line with the other parked vehicles. Currently, self-parking vehicles may require input from a driver, such that these vehicles are not completely autonomous. For example, the driver may still regulate the speed of the vehicle by pressing and releasing the brake pedal and/or the gas pedal. This, however, requires that the driver remain in the vehicle while the vehicle is parking. There is a need in the art, therefore, for a self-parking vehicle that is capable of parking remotely, independently of driver input.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure relates to a system that includes a memory that stores instructions for executing processes for enabling a vehicle to park remotely, and a processor that executes the instructions. In some aspects, the instructions cause the processor to: analyze an image of the vehicle to identify a vehicle type; extract vehicle information related to the vehicle type; calculate a distance between a mobile device and the vehicle based on the vehicle information and a location of the mobile device; determine whether the mobile device is within a predetermined distance of the vehicle; and enable the vehicle to park remotely when the mobile device is within the predetermined distance.

In another aspect, the present disclosure relates to a system that includes a mobile device having a first memory and a first processor coupled to the first memory. In some aspects, the first processor executes instructions stored by the first memory that cause the first processor to: transmit an image of a vehicle to a server; determine whether the vehicle is within a predetermined distance of the mobile device based on received vehicle information; and enable the vehicle to park remotely when the vehicle is within the predetermined distance of the mobile device. The system also includes the server having a second memory and a second processor coupled to the second memory. In some aspects, the second processor executes instructions stored by the second memory that cause the second processor to: analyze the image from the mobile to identify a vehicle type; extract the vehicle information based on the vehicle type; and transmit the vehicle information to the mobile device.

In a further aspect, the present disclosure relates to a mobile device that includes a memory and a processor coupled to the memory. In some aspects, the processor executes instructions stored by the memory that cause the processor to: transmit an image of a vehicle to a server; determine whether the vehicle is within a predetermined distance of the mobile device based on received vehicle information; and enable the vehicle to park remotely when the vehicle is within the predetermined distance of the mobile device.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein;

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
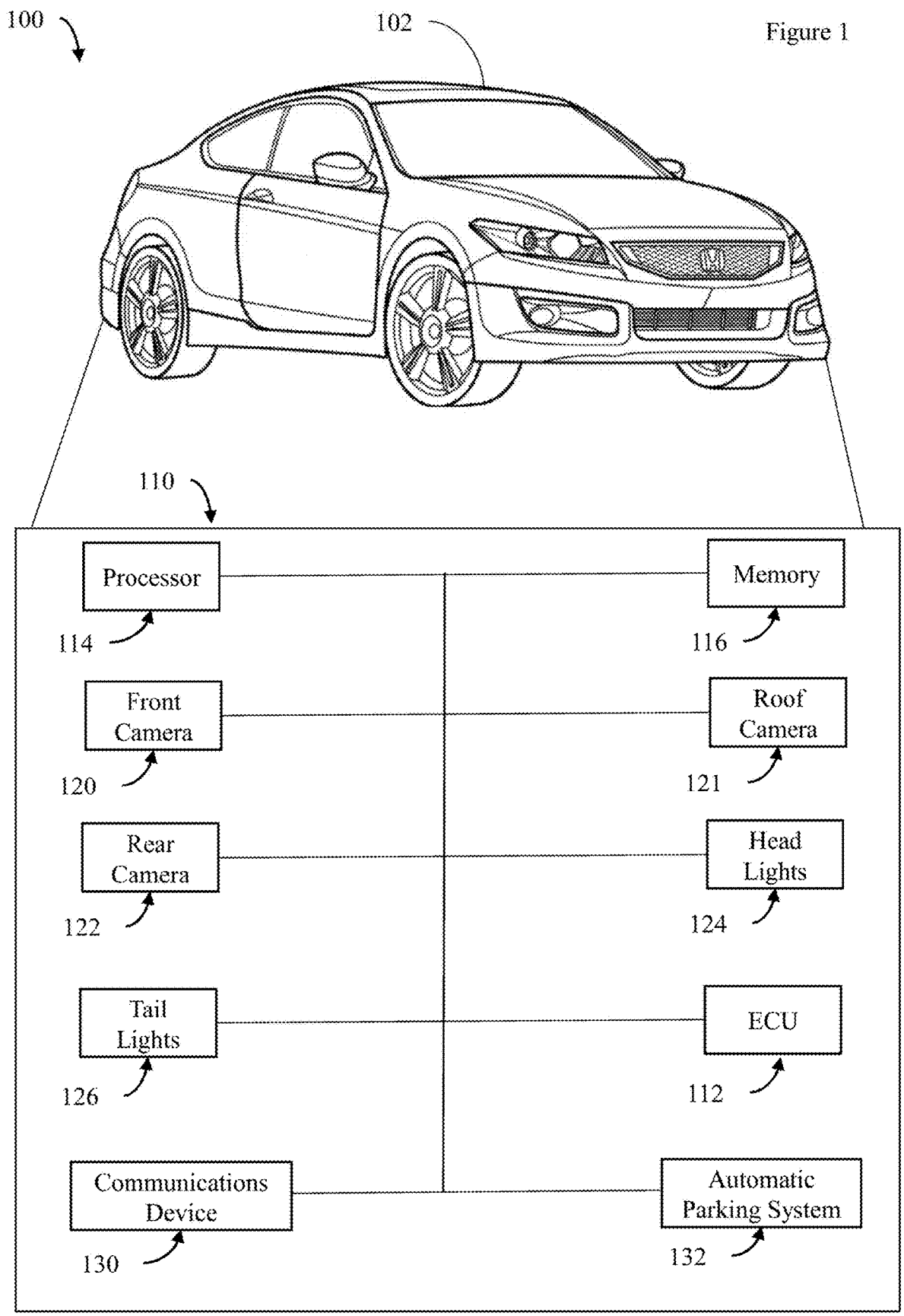
FIG. 1 illustrates a schematic view of an exemplary operating environment of a vehicle system in accordance with aspects of the present disclosure.

Generally described, the present disclosure provides systems and methods for enabling a vehicle to park remotely. Turning to FIG. 1, a schematic view of an example operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110. The vehicle 102 may also include a processor 114 and a memory 116 that communicate with a front camera 120, a roof camera 121, a rear camera 122, head lights 124, tail lights 126, a communications device 130, and an automatic parking system 132.

Each of the front camera 120, roof camera 121, and the rear camera 122 may be a digital camera capable of capturing one or more images or image streams that may be used internally by the vehicle 102 or the one or more images or image streams may be used by an external device, such as mobile device. The head lights 124 and tail lights 126 may include any conventional lights used on vehicles. For example, the head lights 124 and/or tail lights 126 may be activated or controlled to provide desirable lighting when scanning the environment of the vehicle 102.

The communications device 130 may be a modem for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In some aspects, the communications device 130 may be configured for vehicle-to-anything (V2X) communications, which may include wireless communications with a mobile device.

Figure 4:
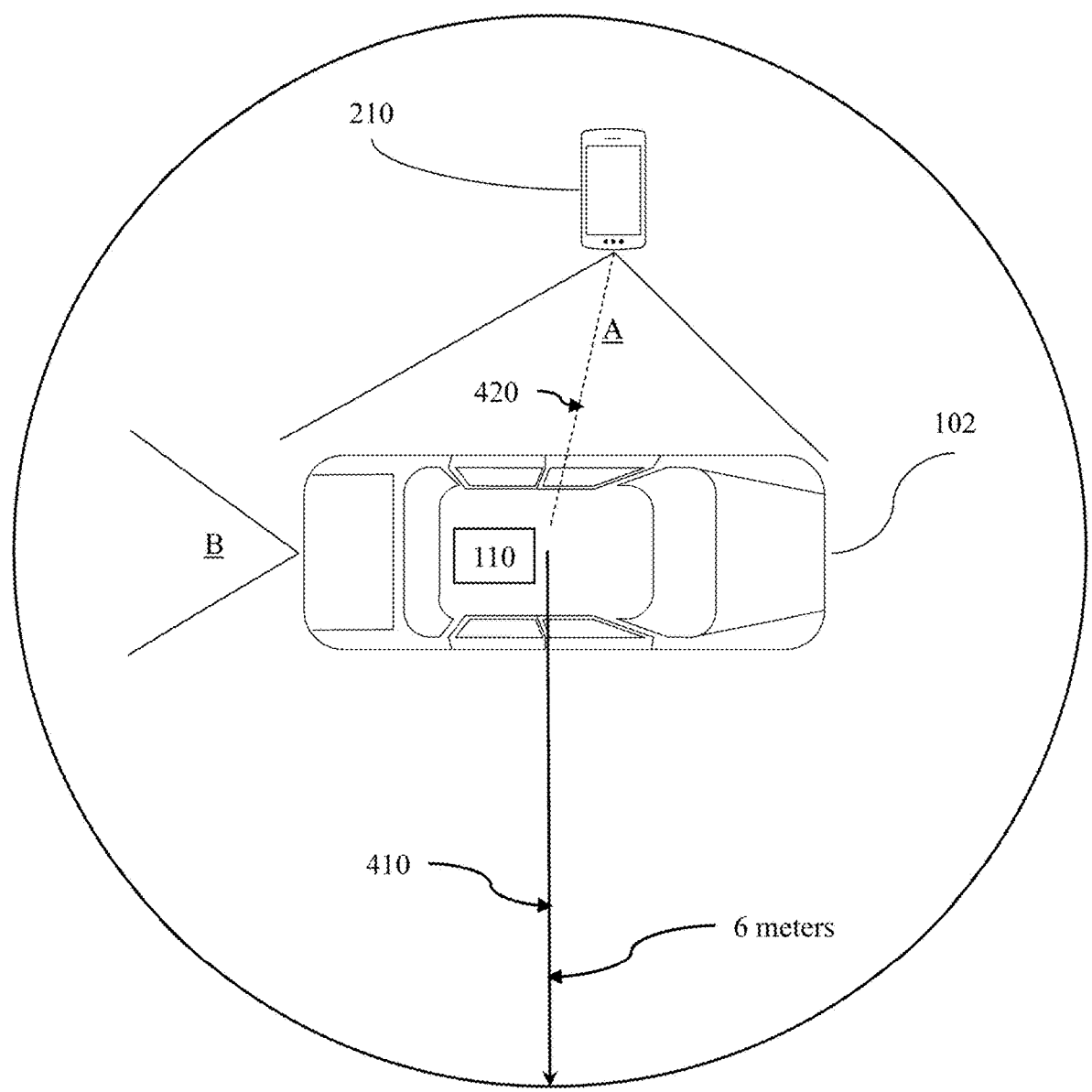
FIG. 4 illustrates an exemplary scenario for determining whether a mobile device is within a predetermined distance of a vehicle, in accordance with aspects of the present disclosure.

The automatic parking system 132 may be configured to enable the vehicle 102 to park remotely, independently of driver input. In some aspects, the automatic parking system 132 may be enabled when a driver is exterior to the vehicle 102 and within a predetermined distance, which may be established by a local, state/province, or national regulation, for example. As one example, as illustrated in FIG. 4, a predetermined distance 410 may be six (6) meters. This distance is merely an example and other distances are also contemplated in accordance with aspects of the present invention.

Figure 2:
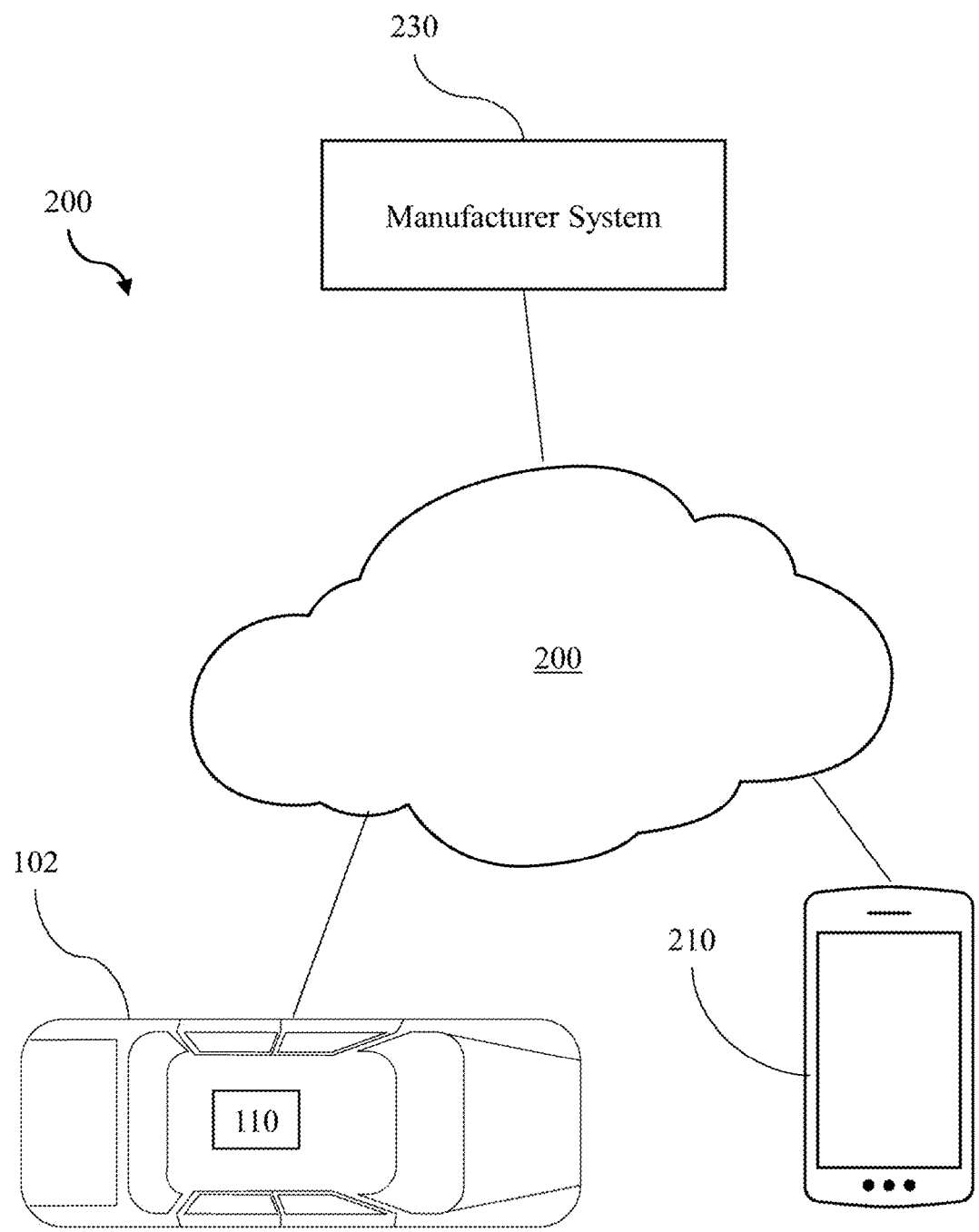
FIG. 2 illustrates an exemplary network for managing the vehicle system, in accordance with aspects of the present disclosure.

FIG. 2 illustrates an exemplary network 200 for facilitating communications between multiple systems, such as the vehicle system 110, a mobile device 210, and/or a manufacturer system 230. For example, the network 200 may include the Internet or another Internet Protocol (IP) based network. The vehicle system 110 within the vehicle 102 may communicate over the network 200 via the communications device 130. In some aspects, communications between the vehicle system 110, the mobile device 210, and/or the manufacturer system 230 may be used to enable the vehicle 102 to park remotely, independently of driver input. In some aspects, the manufacturer system 230 and/or the mobile device 210 may include a computer system, as shown with respect to FIG. 3 described below.

In some aspects, the mobile device 210 may include a camera (not shown) that may be used to capture an image of the vehicle 102 and a transceiver (not shown) that may be used to transmit the image to the manufacturer system 230 via the network 200. For example, as illustrated in FIG. 4, the mobile device 210 may have a field of view A that encompasses a view of the vehicle 102, such that the mobile device 210 may capture an image of the vehicle 102. In some aspects, the image may also include metadata, such as global-positioning system (GPS) location information of the mobile device 210.

Upon receipt of the image, using machine learning algorithms, the manufacturer system 230 may analyze the image to identify physical features of the vehicle 102 and determine which vehicle is illustrated in the image based on the identified physical features. For example, the manufacturer system 230 may determine which vehicle is illustrated by analyzing a body style of the vehicle 102, e.g., whether the vehicle 102 is a coupe, a sedan, a mini-van, a sport utility vehicle, or a crossover, etc. In other aspects, the manufacturer system 230 may determine which vehicle is illustrated by analyzing other physical features of the vehicle 102, such a shape of the vehicle 102, a type of headlights/taillights of the vehicle 102, a style of a wheel of the vehicle 102, or any other physical feature of the vehicle 102 that may be identified in the image (e.g., a decal of the vehicle identifying a model of the vehicle). In some aspects, using machine learning algorithms, the manufacturer system 230 may determine a make, model, and year of the vehicle 102 based on the physical features of the vehicle 102 identified in the image. After identifying the vehicle 102 in the image, the manufacturer system 230 may extract information related to the vehicle, e.g., dimensions including a height, a width, and a length of the vehicle 102, from a database.

In some aspects, the manufacturer system 230 may obtain location GPS location information of the vehicle 102 via the communications device 130, and determine whether the mobile device 210 is within the predetermined distance of the vehicle 102. For example, the manufacturer system 230 may calculate a distance 420 between the mobile device 210 and the vehicle 102 based on the information related to the vehicle, the GPS location information of the vehicle 102, and the GPS location information of the mobile device 210, and determine whether the distance 420 is less than the predetermined distance 410. When the mobile device 210 is within the predetermined distance 410 of the vehicle 102, as illustrated in FIG. 4, the manufacturer system 230 may enable the automatic parking system 132 to park the vehicle 102 remotely, independent of any driver input. For example, the manufacturer system 230 may enable the automatic parking system 132 to park the vehicle 102 remotely via a direct communication with the vehicle 102 using the communications device 130. In other aspects, the manufacturer system 230 may enable the automatic parking system 132 to park the vehicle 102 remotely via an indirect communication with the vehicle 102 through the mobile device 210.

In other aspects, the manufacturer system 230 may transmit the information related to the vehicle 102 to the mobile device 210, and the mobile device 210 may calculate the distance 420 between the mobile device 210 and the vehicle 102 based on the information related to the vehicle 102 from the manufacturer system 230, the GPS location information of the vehicle 102, and the GPS location information of the mobile device 210, and determine whether the distance 420 is less than the predetermined distance 410. When the mobile device 210 is within the predetermined distance 410 of the vehicle 102, as illustrated in FIG. 4, the mobile device 210 may enable the automatic parking system 132 to park the vehicle 102 remotely, independent of any driver input.

Figure 5:
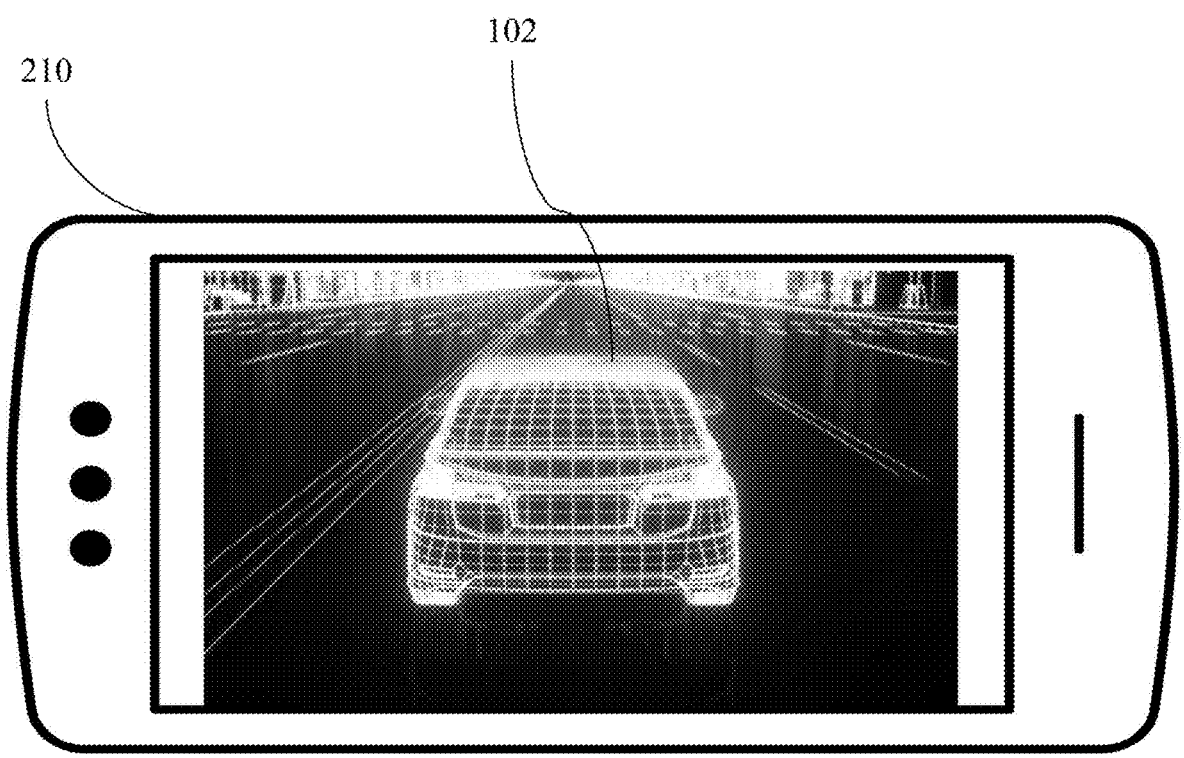
FIG. 5 illustrates an exemplary image of a vehicle displayed on a mobile device, in accordance with aspects of the present disclosure.

In some aspects, the manufacturer system 230 may also transmit a silhouette of the identified vehicle to the mobile device 210. Using this silhouette and images obtained via a camera, e.g., such as the rear camera 122, having a field of view B, the mobile device 210 may display an image of the vehicle 102, as illustrated in FIG. 5, using the dimensions of the vehicle 102 as the vehicle 102 parks remotely.

Figure 3:
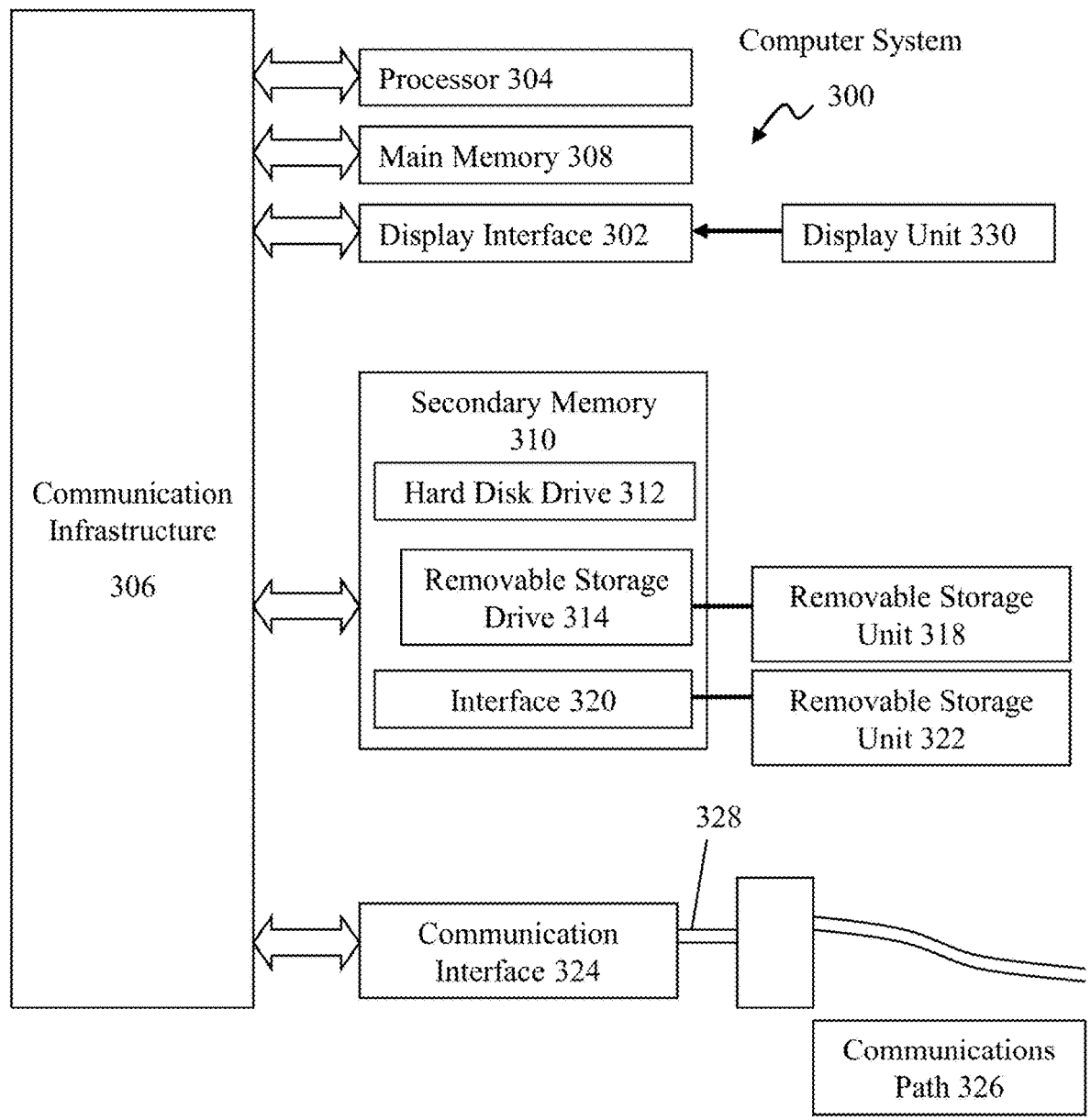
FIG. 3 illustrates various features of an exemplary computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 6:
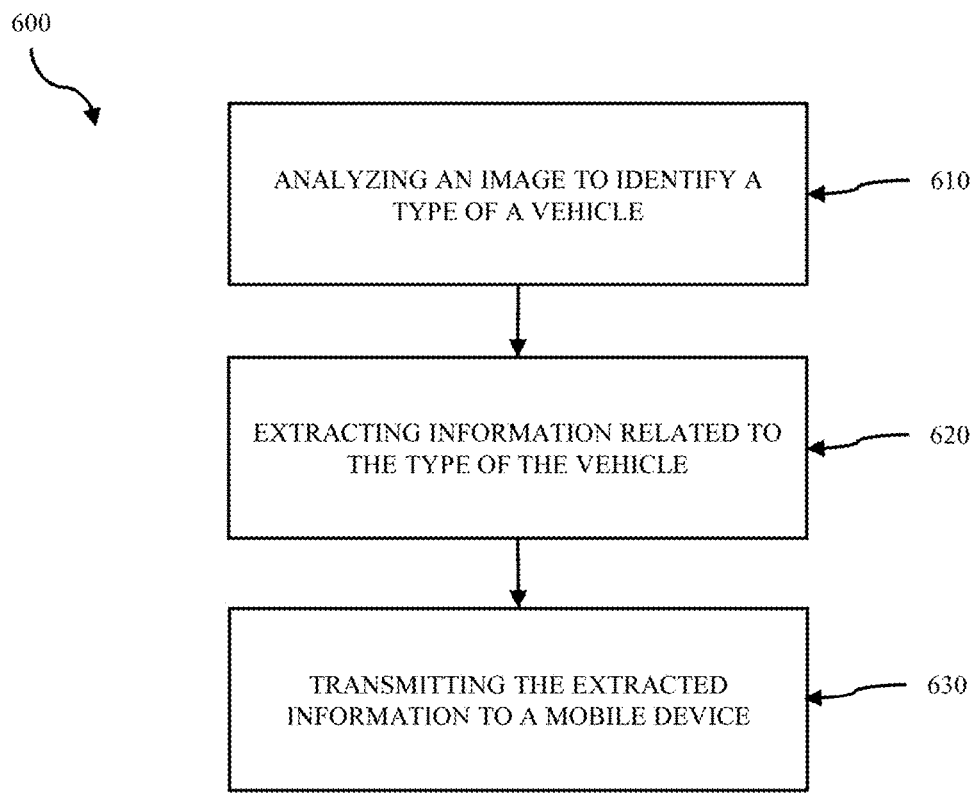
FIG. 6 illustrates an exemplary flowchart for enabling a vehicle to park remotely.

FIG. 6 illustrates an exemplary flowchart for enabling a vehicle to park remotely. A method 600 includes analyzing an image to identify a type of a vehicle 610. The method also includes extracting information related to the type of the vehicle 620. The method further includes transmitting the extracted information to a mobile device, wherein the vehicle is enabled to park remotely when the mobile device is within a predetermined distance of the vehicle 630.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
   a memory that stores instructions for executing processes for enabling a vehicle to park remotely; and
   a processor executing the instructions, wherein the instructions cause the processor to:
      analyze an image of the vehicle to identify a vehicle type;
      extract vehicle information related to the vehicle type;
      calculate a distance between a mobile device and the vehicle based on the vehicle information and a location of the mobile device;
      determine whether the mobile device is within a predetermined distance of the vehicle; and
      enable the vehicle to park remotely when the mobile device is within the predetermined distance;
   wherein analyzing the image comprises:
   identifying at least one physical feature of the vehicle; and
   determining the vehicle type based on the identified at least one physical feature; and
   wherein the at least one physical feature includes at least one of a body style of the vehicle, a type of a headlight of the vehicle, a type of a taillight of the vehicle, a style of a wheel of the vehicle, or a decal identifying a model of the vehicle.

2. The system of claim 1, wherein determining the vehicle type comprises determining a make, a model, and a year of the vehicle.

3. The system of claim 2, wherein extracting the vehicle information comprises extracting, from a database, dimensions of the vehicle based on the make, the model, and the year of the vehicle.

4. The system of claim 3, wherein determining whether the vehicle is within the predetermined distance of the mobile device comprises:
   calculating a distance between the mobile device and the vehicle, the distance being based on the dimensions of the vehicle, a location of the vehicle, and a location the mobile device; and
   determining whether the distance is less than the predetermined distance.

5. The system of claim 1, wherein the predetermined distance is based on a regulation.

6. A system comprising:
   a mobile device comprising a first memory and a first processor coupled to the first memory, the first processor executing instructions stored by the first memory that cause the first processor to:
      transmit an image of a vehicle to a server;
      determine whether the vehicle is within a predetermined distance of the mobile device based on received vehicle information; and
      enable the vehicle to park remotely when the vehicle is within the predetermined distance of the mobile device; and
   the server comprising a second memory and a second processor coupled to the second memory, the second processor executing instructions stored by the second memory that cause the second processor to:
      analyze the image from the mobile to identify a vehicle type;
      extract the vehicle information based on the vehicle type; and
      transmit the vehicle information to the mobile device;
   wherein analyzing the image, by the second processor, comprises:
   identifying at least one physical feature of the vehicle; and
   determining the vehicle type based on the identified at least one physical feature; and
   wherein the at least one physical feature includes at least one of a body style of the vehicle, a type of a headlight of the vehicle, a type of a taillight of the vehicle, a style of a wheel of the vehicle, or a decal identifying a model of the vehicle.

7. The system of claim 6, wherein determining the vehicle type comprises determining a make, a model, and a year of the vehicle.

8. The system of claim 7, extracting the vehicle information comprises extracting, from a database, dimensions of the vehicle based on the make, the model, and the year of the vehicle.

9. The system of claim 8, wherein determining whether the vehicle is within the predetermined distance of the mobile device comprises:
   calculating a distance between the mobile device and the vehicle, the distance being based on the dimensions of the vehicle, a location of the vehicle, and a location the mobile device; and
   determining whether the distance is less than the predetermined distance.

10. The system of claim 6, wherein the predetermined distance is based on a regulation.

11. A mobile device comprising:
    a memory; and
    a processor coupled to the memory, the processor executing instructions stored by the memory that cause the processor to:
       transmit an image of a vehicle to a server;
       determine whether the vehicle is within a predetermined distance of the mobile device based on received vehicle information; and
       enable the vehicle to park remotely when the vehicle is within the predetermined distance of the mobile device;
    wherein the vehicle information is based on at least one physical feature of the vehicle; and
    wherein the at least one physical feature includes at least one of a body style of the vehicle, a type of a headlight of the vehicle, a type of a taillight of the vehicle, a style of a wheel of the vehicle, or a decal identifying a model of the vehicle.

12. The system of claim 11, wherein the vehicle information is extracted from a database based on a make, a model, and a year of the vehicle.

13. The system of claim 12, wherein the vehicle information includes dimensions of the vehicle based on the make, the model, and the year of the vehicle.

14. The system of claim 13, wherein determining whether the vehicle is within the predetermined distance of the mobile device comprises:
  calculating a distance between the mobile device and the vehicle, the distance being based on the dimensions of the vehicle, a location of the vehicle, and a location the mobile device; and
  determining whether the distance is less than the predetermined distance.

* * * * *